(12) United States Patent
Busila et al.

(10) Patent No.: US 12,046,066 B2
(45) Date of Patent: Jul. 23, 2024

(54) DATA EXTRACTION FROM SHORT BUSINESS DOCUMENTS

(71) Applicant: SERVICENOW CANADA INC., Montreal (CA)

(72) Inventors: Elena Busila, Montreal (CA); Jerome Pasquero, Montreal (CA); Tim Beiko, Montreal (CA); Evelin Fonseca Cruz, Montreal (CA); Minh-Kim Dao, Montreal (CA); Majid Laali, Montreal (CA); Patrick Lazarus, Montreal (CA)

(73) Assignee: ServiceNow Canada Inc., Montreal (CA)

( * ) Notice: Subject to any disclaimer, the term of this patent is extended or adjusted under 35 U.S.C. 154(b) by 618 days.

(21) Appl. No.: 17/252,678

(22) PCT Filed: Jun. 21, 2019

(86) PCT No.: PCT/CA2019/050874
§ 371 (c)(1),
(2) Date: Dec. 15, 2020

(87) PCT Pub. No.: WO2019/241897
PCT Pub. Date: Dec. 26, 2019

(65) Prior Publication Data
US 2021/0334530 A1   Oct. 28, 2021

Related U.S. Application Data

(60) Provisional application No. 62/688,046, filed on Jun. 21, 2018.

(51) Int. Cl.
*G06V 30/414* (2022.01)
*G06F 16/906* (2019.01)
(Continued)

(52) U.S. Cl.
CPC .......... *G06V 30/414* (2022.01); *G06F 16/906* (2019.01); *G06N 20/00* (2019.01);
(Continued)

(58) Field of Classification Search
CPC .. G06V 30/414; G06V 30/133; G06V 30/413; G06V 30/416; G06V 30/10;
(Continued)

(56) References Cited

U.S. PATENT DOCUMENTS 6,975,761 B1    12/2005    Swann et al.
2004/0243602 A1  12/2004   Shiiyama
(Continued)

FOREIGN PATENT DOCUMENTS

CN    107220648    9/2017

*Primary Examiner* — Stephen P Coleman
(74) *Attorney, Agent, or Firm* — FASKEN MARTINEAU DUMOULIN LLP; Dennis R. Haszko; Serge Lapointe

(57) ABSTRACT

Systems and methods for document analysis. An image containing at least one document is received at a pre-processing stage and the image is analyzed for image quality. If the image quality is insufficient for further processing, this is adjusted until the image is suitable for further processing. After the image quality adjustment, the image is then passed to an initial processing stage. At the initial processing stage, the boundaries of one or more documents within the image are determined. In addition, the orientation of the image may be adjusted and the type of document(s) within the image is determined. From the initial processing stage, the adjusted image is then passed to a data extraction stage. At this stage, clusters of data within the document are determined and bounding boxes are placed around the clusters. Data regarding each of the clusters of data is then gathered.

17 Claims, 5 Drawing Sheets

(51) Int. Cl.
  *G06N 20/00* (2019.01)
  *G06T 5/73* (2024.01)
  *G06T 5/80* (2024.01)
  *G06V 30/12* (2022.01)
  *G06V 30/413* (2022.01)
  *G06V 30/416* (2022.01)
  *G06V 30/10* (2022.01)

(52) U.S. Cl.
  CPC .................. *G06T 5/73* (2024.01); *G06T 5/80* (2024.01); *G06V 30/133* (2022.01); *G06V 30/413* (2022.01); *G06V 30/416* (2022.01); *G06T 2207/20132* (2013.01); *G06V 30/10* (2022.01)

(58) Field of Classification Search
  CPC ....... G06F 16/906; G06N 20/00; G06T 5/003; G06T 5/006; G06T 2207/20132
  USPC ........................................................ 382/176
  See application file for complete search history.

(56) References Cited

U.S. PATENT DOCUMENTS

2005/0289182 A1\* 12/2005 Pandian ................. G06Q 10/10
2016/0171627 A1 6/2016 Lyubarskiy
2017/0351913 A1 12/2017 Chen et al.
2019/0147239 A1\* 5/2019 Jin ....................... G06V 30/414
  382/173

\* cited by examiner

DATA EXTRACTION FROM SHORT BUSINESS DOCUMENTS

CROSS REFERENCE TO RELATED APPLICATIONS

The present application is a U.S. National Phase Application pursuant to 35 U.S.C § 371 of International Application No. PCT/CA2019/050874 filed Jun. 21, 2019, which claims priority to U.S. Provisional Patent Application No. 62/688,046 filed Jun. 21, 2018. The entire disclosure contents of these applications are herewith incorporated by reference into the present application.

TECHNICAL FIELD

The present invention relates to document processing. More specifically, the present invention relates to systems and methods that determine the type of data contained in clusters of data in a document.

BACKGROUND

The early 21st century has been characterized with the rise and increasing ubiquity of information technology as applied to everything from food production to entertainment options. However, even with such developments, the business world still revolves around paper and its representations. As an example, business is still conducted with letters (on paper), with invoices (printed on paper), and receipts (printed on paper). While a paperless society has been much touted, the fact remains that paper is still widely used and, even if attempts are underway to phase out paper, it is unlikely that the form of the data on that paper will change any time soon. As an example of this, even paperless invoices and receipt still look the same as if they were on printed on paper.

As should be clear, in business, it is not the paper letters, or the paper invoices, or the paper receipts that are important. Rather, it is the data that the letter, invoice, or receipt that is important. Because it is the data that is important, whole industries have sprouted towards the concept of extracting that data so that it can be used in today's information processing systems. Currently, letters, invoices, receipts, and other documents (or their images) are, in many cases, manually reviewed by a human before that human extracts the necessary data from the documents. The relevant data is keyed into information systems so that other documents may be generated or so that the data may be used by those information systems. Unfortunately, current systems are, by their very human-based nature, inefficient and prone to errors. Teams of keyboardists are forever keying in names, dates, addresses, receipt totals, and other bits of data from such documents into information systems. Such keying processes are time consuming and are subject to human error. As well, human entry of data into such information systems are potentially fraught with errors of omission as data that may need to be entered may not be entered due to the person either missing the data or judging that the data is unnecessary.

From the above, there is therefore a need for systems and methods that can extract relevant data from such documents. Preferably, such systems and methods would require little to no human intervention once they have been suitably launched.

SUMMARY

The present invention relates to and methods for document analysis. An image is received at a pre-processing stage and the image is analyzed for image quality. If the image quality is insufficient for further processing, the image quality is adjusted until the image is suitable for further processing. After the image quality has been adjusted, the image is then passed to an initial processing stage. At the initial processing stage, the boundaries of one or more documents within the image are determined. In addition, the orientation of the image may be adjusted and the type of document within the image is determined. From the initial processing stage, the adjusted image is then passed to a data extraction stage. At this stage, clusters of data within the document are determined and bounding boxes, where necessary, are placed around the clusters. As well, data regarding each of the clusters of data are gathered. This may include the type of data within each cluster as well as parameters of that data within the cluster. The resulting data set can then be used to determine the contents of the document.

In a first aspect, the present invention provides a system for processing an image containing at least one document, the system comprising:
  a pre-processing stage for ensuring that an image quality of said image is suitable for processing;
  an initial processing stage for determining at least one boundary of said at least one document, said initial processing stage receiving an output of said pre-processing stage;
  a data extraction stage for determining clusters of data in said at least one document and for determining data regarding said clusters of data, said data extraction stage receiving an output of said initial processing stage;
wherein said system produces an output suitable for further processing to determine contents of said at least one document.

In one aspect, the present invention provides a method for determining at least one type of data present in a business-related document, the method comprising:
  a) receiving an image of said business-related document;
  b) defining clusters of data on said document from said image; and
  c) determining a type of data present in a specific cluster based on at least one of: said specific cluster's position within said document and a content of said specific cluster.

In another aspect, the present invention provides a system for determining at least one type of data present in a business-related document, the system comprising:
  an image reception module for receiving an image of said document;
  a cluster determination module for determining clusters of data in said document using said image;
  a data determination module for determining a type of data present in at least one of specific cluster based on at least one of: a position of said at least one specific cluster in said document and a content of said specific cluster.

BRIEF DESCRIPTION OF THE DRAWINGS

The embodiments of the present invention will now be described by reference to the following figures, in which identical reference numerals in different figures indicate identical elements and in which.

DETAILED DESCRIPTION

Figure 1:
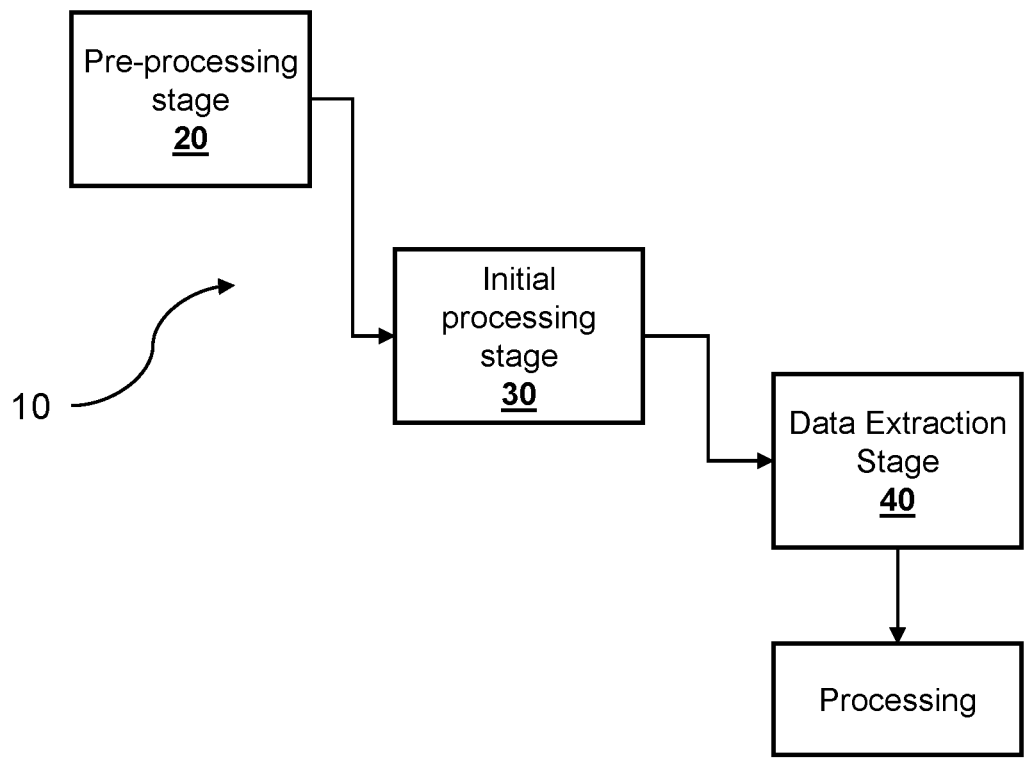
FIG. 1 is a block diagram of a system according to a first aspect of the invention.

Referring to FIG. 1, a block diagram according to one aspect of the invention is illustrated. This aspect of the invention includes a system 10 that has a pre-processing stage 20, an initial processing stage 30, and a data extraction stage 40. Once the relevant data from a document within an image has been extracted, the data can then be processed accordingly.

The pre-processing stage 20 receives the image that contains at least one document. The pre-processing stage 20 determines if the image is of a sufficient image quality for further processing. To this end, the pre-processing stage may analyze the image's contrast, color, image size, orientation, and sharpness, as well as the presence or absence of any artefacts that may affect the image's clarity. If these image quality parameters are insufficient for further processing (e.g. the color balance and/or contrast is such that OCR cannot determine characters), the pre-processing stage adjusts these parameters as necessary. In addition to adjusting the contrast, color, geometry, and sharpness of the image, the pre-processing stage may also crop the image and/or remove artefacts that may affect the clarity of the image.

It should be clear that the adjustment of the various parameters of the image may be executed by various suitable image adjustment modules according to predetermined limits and/or standards. Such modules are well-known to those of skill in the art of image processing and/or image quality adjustment. These modules may implement methods such as using a Fast Fourier Transform to determine what transformations/parameters may be required to establish a match between a candidate image containing a document and a reference template for that type of document. Similarly, homography based methods and processes may be used to determine these transformations/parameters to ensure a best fit between the candidate image containing the document and a template for that document. These methods may also be used to ensure a best fit between the candidate image and one of multiple templates for various different but similar documents. Such methods can thus be used to determine the type of document in the image if there are multiple similar types documents, each of which has a specific template. By determining which template best fits the document in the image, it can be determined that this document in the image is of the same type as the template which has a best fit.

After the pre-processing stage, the adjusted image is then sent to the initial processing stage. The initial processing stage ensures that the boundaries of the document (or documents) in the image are well-defined and determined. It should be clear that the image may contain more than one document and, as such, the boundaries between documents need to be determined. This can be done by searching the image for lines that delineate boundaries between documents (i.e. a dividing line) or large areas where there are no markings (i.e. the empty space at the bottom of one document merging with the empty space of an adjoining document, especially if the documents are arranged in a vertical fashion). In doing so, the initial processing stage determines the top and/or bottom of the document or documents within the image. It should be clear that other sections/features/artefacts may be used to delineate different pages or different documents. As an example, headers and footers in documents can be found within the image and these can be used to determine the beginning or the end of pages.

In addition to the boundaries of the documents within the image, the initial processing stage may also adjust the orientation of the image to ensure easier processing of the data within. Specifically, the initial processing stage may rotate the image to ensure that the image is square on a screen. This rotation may be a full 180 degree rotation (e.g. if the document is upside down in the image) or a partial rotation (e.g. if the document is at an angle within the image) as necessary. As well, the image may be geometrically translated (i.e. adjusted or moved to the left/right/up/down as necessary) to again, ensure that the image is square on the screen. Similarly, if necessary, the image may be automatically adjusted to correct for shears and/or projection effects. For clarity, projection effects are image effects that result when, for example, an image of a document is taken at an angle and a foreshortening of the elements (i.e. a vanishing point effect) in the image results. These corrections, and others, ensure that the resulting image is easier to process.

Finally, the initial processing stage may also determine the type of document within the image. If multiple documents are in the image, the initial processing stage may analyze one or more of these documents to determine what type of document is being handled. To perform this function, the initial processing stage may perform OCR (optical character recognition) on one or more of the documents to determine if specific keywords can be in each document. As an example, if the keyword "invoice" can be found within a document (especially at a top portion of the document), then there is a good probability that the document being dealt with is an invoice. Similarly, other keywords (e.g. "statement", "report", "receipt", "purchase order") may also be searched for in the documents to determine the document type being dealt with.

It should be clear that the analysis and adjustment of the document or documents within the image may be performed by different modules within the initial processing stage. An OCR module may be used to perform OCR on one or more documents while an image alignment module may be used to determine whether a document within the image is properly aligned (i.e. whether the document is square on a screen or is angled or askew). The adjustments may, of course, be performed by one or more different modules from the analysis modules.

In one implementation of the present invention, if there are multiple documents within the image, the section of the image covering only one document is extracted and sent to the next stage. This may be done to ensure that the system only deals with one document at a time. Of course, in other implementations, multiple documents may be extracted from the image and these separated documents may be passed on separately (or as a group) to the next stage in the system.

After the boundaries of the document within the image have been determined, the adjusted image is then passed to a data extraction stage. The data extraction stage determines the clusters of data within the document, determines the type of data within each of the clusters of data, and places bounding boxes (where necessary) around the various individual clusters of data. The location (within the document) of each cluster of data is also determined and, where necessary, adjacent clusters of data are concatenated to form larger clusters. This may be necessary if the data in one cluster is part of a data set (e.g. one cluster has a first part of an address and its adjacent cluster has the second part of the address—these two clusters are concatenated to form a single cluster of data that contains the address).

It should be clear that the data extraction stage determines the type of data within each cluster of data within the document. This includes determining if the data within the cluster is an image (e.g. a bar code, a picture, etc.), text (i.e. alphanumeric characters), a table, a signature, a check box, a radio button, or any other type of data or data indication that may be encountered in a business document. In addition to determining this, the data extraction stage also determines the parameters of the cluster as well as the parameters of the data within the clusters. Thus, the data extraction stage can determine the size of the clusters (in pixels). This may mean determining the length, width, and height of the clusters in pixels or in any other suitable measurement units. For clusters of data containing text data, the data extraction stage can determine the font type as well as the font size of the text data. For image data, the size of the image, the lines within the image, the shapes within the image, as well as the presence of absence of text within the image can be determined. For table data (i.e. the cluster data contains a table), the data extraction stage determines the parameters of the data within the table. For data that tends to be of a binary nature (e.g. check box or radio button that is either filled in/checked or unchecked/unfilled in), the data extraction stage determines whether that box/button is checked or filled in. Similarly, other data that can be provided from a range of options provided to the person filling in the document can similarly be extracted (i.e. context appropriate markings on the document that is used to indicate meaning or intent).

It should be clear that the data extraction stage not only determines clusters but also places bounding boxes where necessary to delimit the various clusters. Of course, the term "bounding boxes" also includes different shapes, sizes, and configurations for means and methods that delimit, delineate, or otherwise indicate a cluster of data and that is machine readable on the image. Such bounding boxes also includes boxes or shapes that are non-regular in shape, size, or orientation (e.g. at an angle).

It should also be clear that the data extraction stage can also determine the type of content in cluster data containing images. The data extraction stage can determine whether the image data indicates that the cluster contains a logo, a signature, or a picture of some sort. As noted above, any text within the image can be determined and, where necessary, extracted.

From the above, the data extraction module would need to perform OCR functions on various clusters to determine the text within the clusters. For this function, a suitable OCR module may be used. As well, other modules specifically suited for the above noted tasks may be used. Thus, dedicated modules for cluster determination, cluster concatenation, image recognition, text parameter determination, image parameter determination, and other functions may be used. Of course, depending on the configuration of the system, multiple functions may be performed by one or more modules. A person of skill in the art of OCR, data analysis, text and image analysis and determination, can determine which modules and which functions are necessary to implement the various stages and modules of the present invention.

In one implementation of the present invention, the output of the system is a listing of the various clusters of data within the document. Each cluster's parameters, contents, location/position, and the parameters of the cluster's contents are associated with each cluster. This output can thus be used by a machine learning system to determine and/or extract the desired and/or relevant contents of document. As an example, if the document is a receipt or an invoice, the date, number, total amounts, and issuing entity can be extracted from the document after these have been determined. Similarly, the address of the addressee (if the document is an invoice or a statement) can also be extracted from the document. It should be clear that the data within the document can be extracted and that the data's parameters (e.g. font size, font type, position/location within the document, etc., etc.) can be used to extract and/or be used to determine a meaning for the data. This meaning can be used to determine what each cluster of data represents and, as such, this meaning can be used to determine how such data can be processed accordingly. Of course, the meaning of the data can be determined using machine learning systems and methods such as, for example, neural networks. It should be clear that, since a machine learning system can extrapolate the meaning of the data within a cluster, by providing as much information regarding the cluster and its data content, the machine learning system should be able to better perform its functions by being provided with more data.

In another implementation of the present invention, document embeddings (and possibly raw image pixels), cluster positions/locations, bounding box positions/locations (and contents), text embeddings (and other embeddings) may be the output of the system. Such outputs can then be used as input to a machine learning system that determines the contents of the various clusters and extracts/processes such contents.

Yet another implementation of the present invention takes the output of the system in FIG. 1 and classifies and/or localizes/segments and/or extracts the data within the document. For a classification implementation, the various clusters of data within the document are classified into a number of specific classes of data cluster. As an example, clusters can be classified as an address cluster (e.g. an address block in an invoice or statement), a document title/type cluster (e.g. a block indicating an invoice or a statement), a data cluster, an item description cluster (e.g. a description of an item itemized in an invoice, receipt, or statement), a signature cluster, a name cluster (e.g. a salutation block in a letter or an "attention" block in a statement/invoice), a logo cluster, a notation cluster (e.g. a handwritten note block in an annotated document), and email address cluster (i.e. a cluster containing an email address), etc., etc. Similarly, the output of the system in FIG. 1 can be used to localize and extract the data in the various clusters. Since, in one implementation, the results of an OCR process are attached or associated with each cluster, extracting the relevant data from a cluster can simply be a matter of copying the relevant field in the data associated with that cluster.

It should be clear that another capability of the various implementations of the present invention is the ability to detect and extract data relating to marked or unmarked check boxes as well as any indications that a person filling out a form has marked his or her selection. As an example, a person filling out a form may need to indicate gender by ticking/marking/checking/circling either a box or a word that indicates the person's gender. In one implementation, the system can be trained (using machine learning) to differentiate between marked and unmarked selections (both handwritten or machine marked) so that the person's intent or intended selection can be gleaned from the document. Thus, a person circling MALE and not circling FEMALE would indicate the person's intent to identify as being of the male gender. The system can be trained to recognize the person's markings to determine that the person intended to be identified as male. Similarly, a person may tick or fill in a check box to indicate some other data point (e.g. an age range, a marital status, etc., etc.) and the system can be trained to recognize the person's markings at the appropriate section of the document to indicate his or her intent. The system can thus be trained to determine the person's selection in a document where only a limited predetermined range of options is presented to the person through the document (e.g. a gender indication, marital status, an age range, etc., etc.)

Yet a further capability of the system is the ability to detect and extract corrections/deletions in a document. As an example, a person filling out a document may strike out a name and handwrite a replacement name. The system can be trained, using machine learning, to recognize the removed value in the document and to recognize that a new value (i.e. the correction) is to be entered in place of the removed value. Suitable training data sets would, of course, be used to ensure that the system can differentiate smudges or bad image quality from a legitimate text strike out in the document. Similarly, the context of the data surrounding the struck out text/data can be used to determine if the strike out is legitimate or is simply an invalid image artefact (e.g. a smudge). This can be implemented using a rule-based algorithm that delineates specific boundaries as to when to indicate that a strike out is legitimate or not or, as in a number of implementations, machine learning can be used to train the system to recognize real (or legitimate) strike outs from image artifacts/smudges.

In addition to the above, the system can also extract data and the user's intent based on not just the markings on the document but also based on the context of those markings. The system can also be trained to process the document based on the content extracted from that document. As an example, assuming the type of document is known, the system can, using machine learning, determine the meaning of one or more data points extracted from the document. A specific check mark in a section of the document relating to marital status can be interpreted to mean that the person is single or married. Once the system has determined that the document's content indicates that the person is single, then the document (or the data extracted from that document) may be routed to a different processing stream as compared to a document indicating that the person is married.

It should be clear that the order of the operations and the order of the functions applied to the image and/or to the document within the image may be adjusted based on the needs of the process and/or the implementation details. As will be evident from the example below, the various functions can be adjusted to ensure that the resulting dataset is suitable for further processing.

In one alternative, the present invention can be implemented using a number of modules not unlike the modules or stages noted above. In this implementation, a document's image is received at an input module. The contents of the document are then divided into clusters whose positions/locations within the document and whose positions/locations relative to other clusters are determined. Based on the positioning/location of specific clusters within the document and/or the contents of the clusters, these clusters are classified as having specific types of data such as names, addresses, and monetary totals. In addition to cluster position, other considerations may be used to determine the type of data contained in the clusters. These considerations may include the location of a cluster relative to other clusters, the size of a cluster, and the presence or absence of specific text in a cluster. Once the type of data in a cluster has been determined, the relevant data can be extracted from that cluster.

It should be clear that this implementation of the present invention differs from the system illustrated in FIG. 1 in that this implementation processes the data from the document to determine the various data types present. The system illustrated in FIG. 1 processes each document to extract the data from the document and the processing to determine the data types present may be performed elsewhere.

Figure 2:
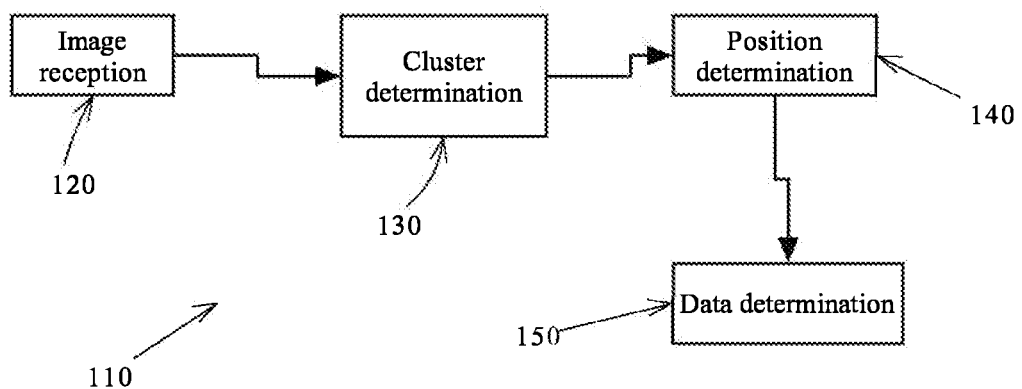
FIG. 2 is block diagram of a system according to another aspect of the invention.

Referring to FIG. 2, a block diagram of a system according to one aspect of the present invention is illustrated. The system 110 includes an image reception module 120, a cluster determination module 130, a position determination module 140, and a data determination module 150. The system receives an image of a document, determines the clusters of data within the document using the image, and then determines the position/location of the various clusters within the document. As well, the system determines the position/location of the clusters relative to other clusters. The system then determines the type of data present in one or more clusters in the document based on that cluster's position/location and/or the content of the cluster. This final determination may be made in conjunction with other considerations.

In the system of FIG. 2, the image reception module 120 receives the image of the document and may perform pre-processing steps such as adjusting the parameters of the image such as contrast, sharpness, color, etc. to render the image easier or at least less difficult to process. The cluster determination module 130 then takes groups of data within the image and determines which data forms which clusters. The position determination module 140 then determines each cluster's absolute position (or location) within the document and also each cluster's position relative to the other clusters. Finally, the data determination module 150 analyzes one or more clusters to determine the type of data within the cluster based a number of factors which may include that cluster's position/location. This position used to determine the data within the cluster may be the cluster's absolute position (in terms of pixel distance or size) in the document or the cluster's position relative to other clusters (again in terms of pixel distance or size).

For purposes of this document, "position" can be taken to mean the place in the image where a cluster is found and this "position" is quantifiable in terms of pixels, pixel distance, or some other form of distance measurement from one or more fixed points in the image or the document. Similarly, the term "location" can be taken to mean the area or region where a cluster may be found within the image or the document. Thus, as an example, a cluster may have a location that is in the upper right quadrant of the image or in the lower half of the image. Similarly, as another example, a cluster may have a position that is x pixels from the right edge of the image and is y pixels from the top edge of the image. It should be clear that, to a person skilled in the art, depending on the implementation of the system, the terms "position" and "location" may be used interchangeably.

Figure 3:
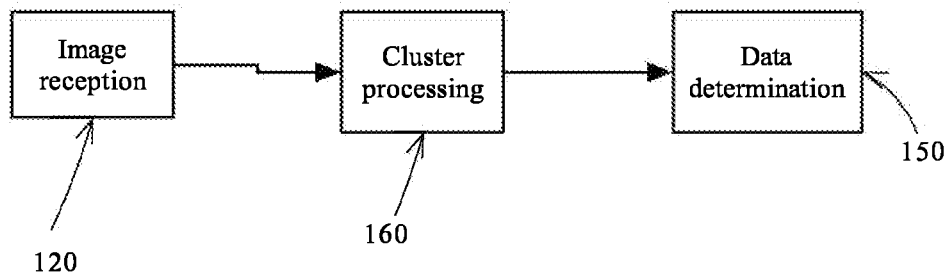
FIG. 3 is a block diagram of a variant of the system illustrated in FIG. 2.

It should be clear that the system illustrated in FIG. 2 represents just one possible implementation of the system of the present invention. Other implementations are, of course, possible. As another possible implementation, FIG. 3 shows a variant where the image reception module 120 and the data determination module 150 are the same as in FIG. 2. In the variant in FIG. 3, the functions of modules 130 and 140 are combined in a single cluster processing module 160 whose output is processed by the data determination module 150. In one implementation, the output of the cluster processing module 160 includes a listing of the clusters (including any concatenated text in each cluster) along with a position indicator for each cluster. This cluster and cluster position listing can then be analyzed by the data determination module 150 to determine the data within one or more of the clusters.

It should be clear that the data determination module 150 may have multiple implementations. In one implementation, a rule based module is used to determine the data within one or more of the clusters in the document. The rules implemented by the module may take into account the absolute position of the cluster, its relative position relative to one or more other clusters, the length of the cluster, as well as the content of that cluster to determine the data within that cluster. As an example, if a cluster's position is close to the top of the document, is adjacent to two smaller clusters, and is of medium size in terms of the font size of the letters or words within the cluster, then that cluster may have an address within it. To explain the foregoing, in a business letter, the address block for the addressee of the letter is close to the top of the document and is between the date and the reference lines. Since the date line is a small cluster and the reference line (i.e. the RE: line) is also a comparatively small cluster, then the cluster between these two small clusters is usually the address block.

It should be clear that a hybrid approach to the data determination module (and to the other modules) may also be used. Such a hybrid approach would have a module use some predetermined rules to perform its functions while other functions would be implemented using a machine learning approach. Thus, some portions of a module may have fixed rules for its functions while other portions would need to be trained using suitable training data sets and suitable machine learning based submodules may be used. Or, in another implementation, a function may be implemented using both rule based and machine learning based methods. Confidence metrics would then be determined for each of the methods and, based on predetermined thresholds, results from one or the other methods would be selected. As an example, if the confidence metrics for the rule based method indicates that the rule based results are more accurate/have a higher confidence metric, then these results may be used in lieu of the results from machine learning based methods. Or, in another example, the system may use a combination of the results from the various rule and machine based methods.

Figure 4:
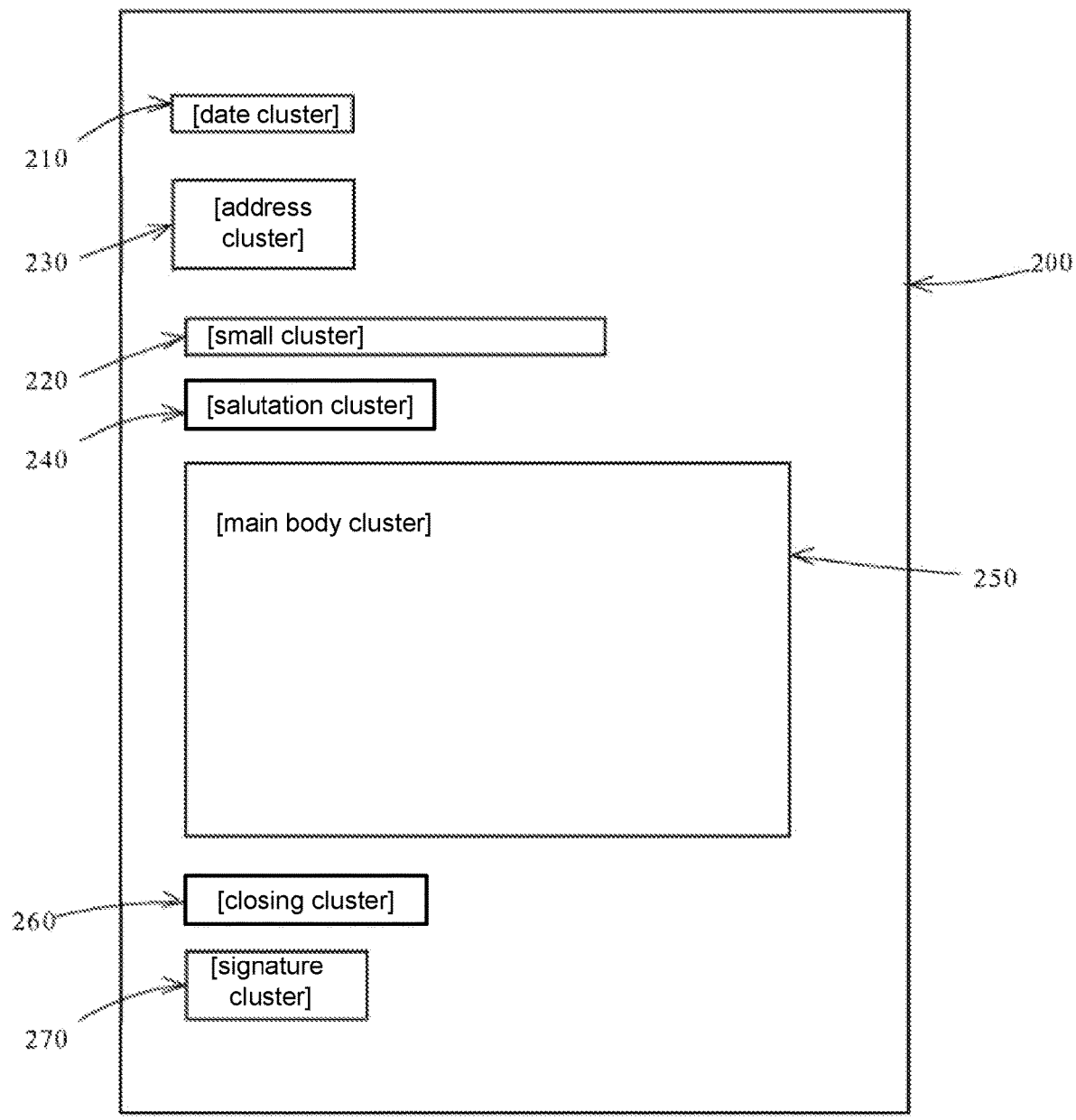
FIG. 4 illustrates a typical business letter detailing the structure of the various clusters of text data in such a letter.
Figure 5:
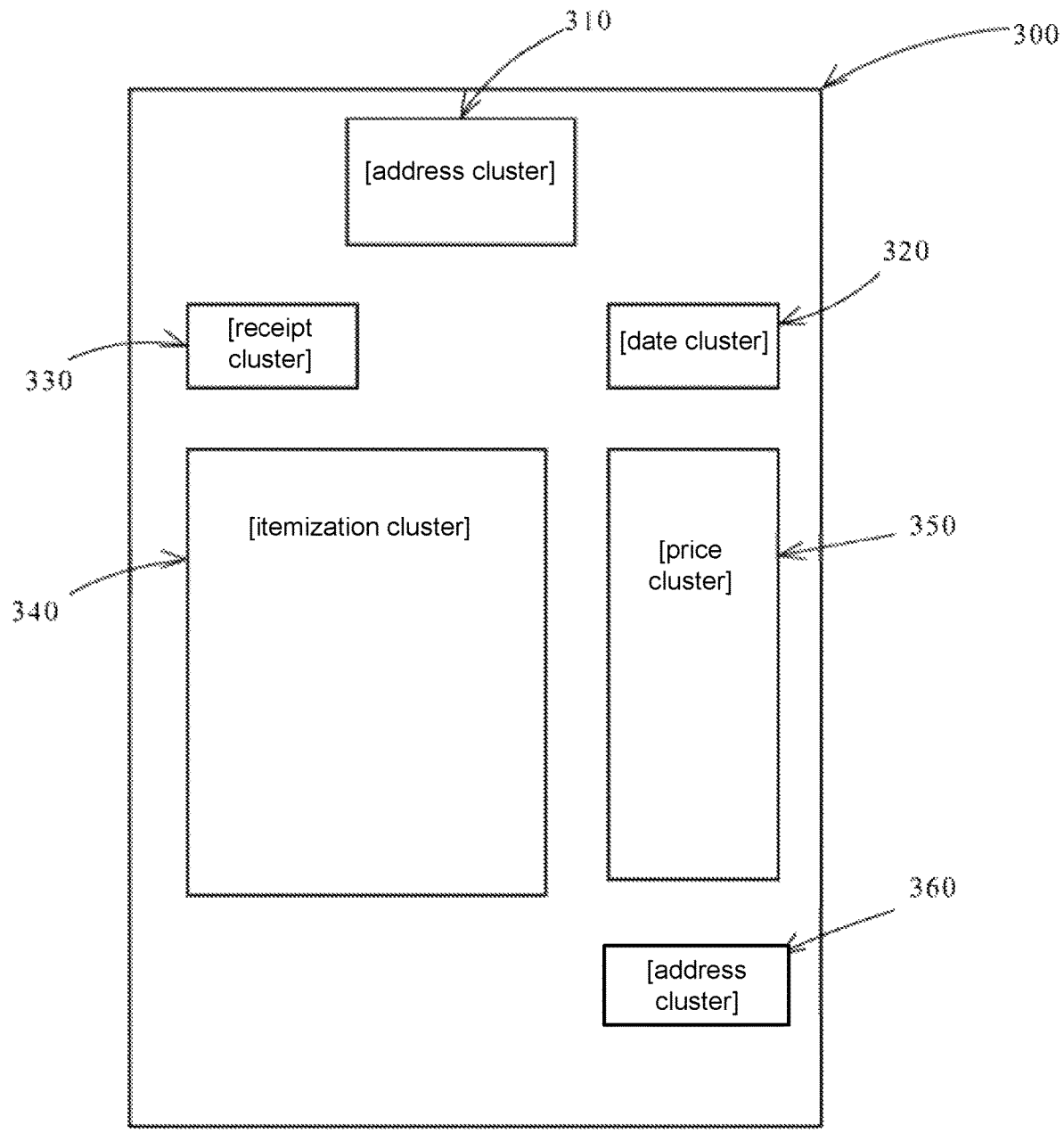
FIG. 5 is a diagram of a typical receipt detailing the structure of the various clusters of text data in such a receipt.
Figure 6:
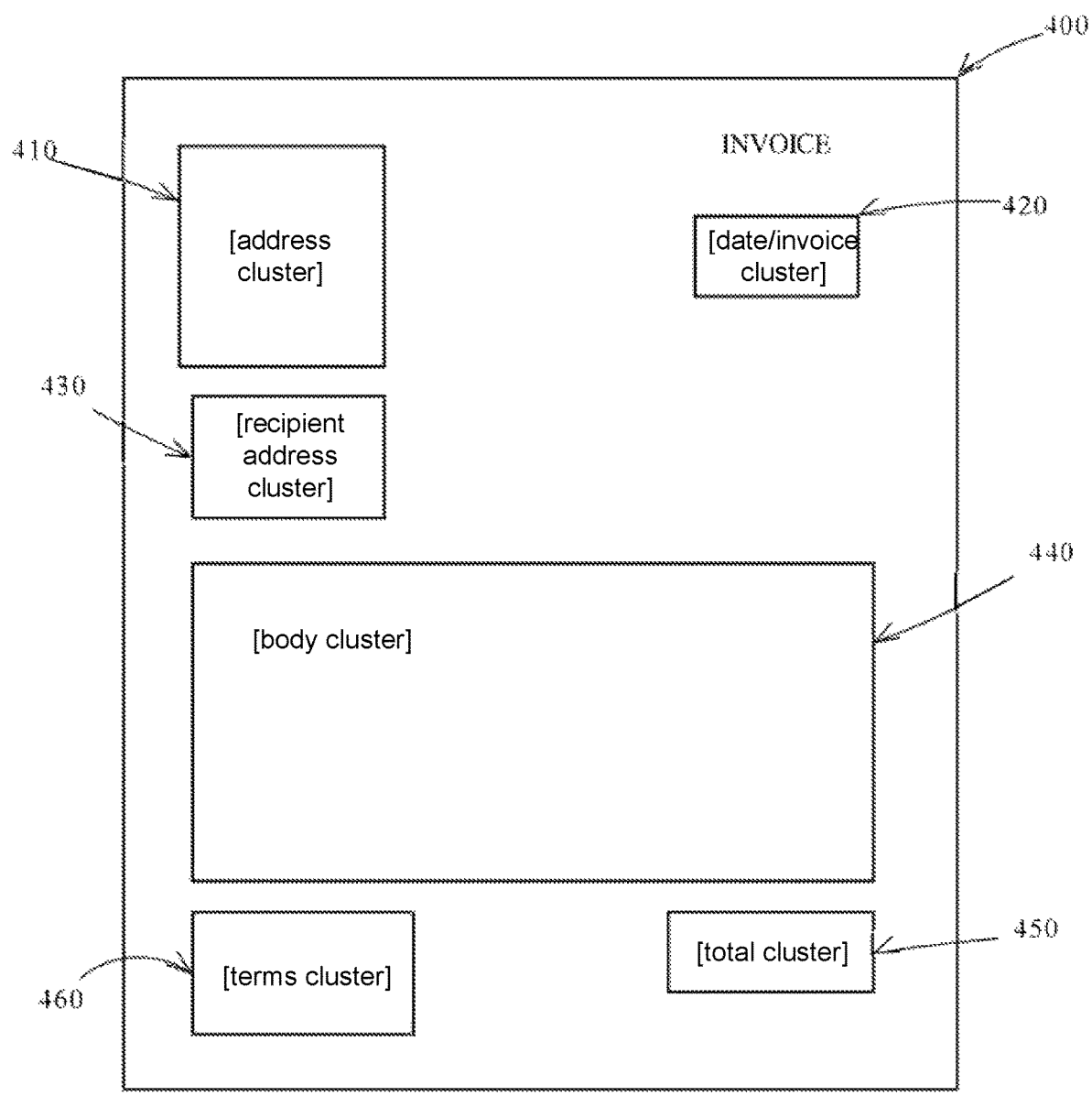
FIG. 6 is a diagram of a typical invoice detailing the structure of the various clusters of text data in such an invoice.

To assist in the explanation of the above, FIGS. 4, 5, and 6 are provided. FIG. 4 illustrates the usual structure of a business letter while FIG. 5 illustrates the usual structure of a receipt. FIG. 6 illustrates the usual structure of a business invoice.

As can be seen from FIG. 4, the document 200 has a cluster 210 at the top of the document (usually a date of the letter). Underneath this small cluster and sandwiched by the other small cluster 220 is usually an address cluster 230. This small cluster 220 usually contains the reference line indicating what the letter is in reference to. This cluster 220 may sometimes be slightly larger in terms of pixel size, depending on the context. A salutation cluster 240 (i.e. a cluster that usually includes a "Dear Sir" or a "Dear [insert name]") is usually between the small cluster 220 and the main body 250 of the letter. A closing cluster 260 and a signature cluster 270 are usually at the bottom of the document.

Referring to FIG. 5, the structure of a receipt 300 is illustrated. Such receipts are usually received from consumer establishments such as stores and restaurants. As can be seen, such a receipt 300 usually has an address cluster 310 at the top of the receipt to indicate the name and location of the business issuing the receipt. A date cluster 320 along with a receipt number cluster 330 are usually below the address cluster 310. It should be noted that while the receipt cluster 330 and the date cluster 220 are shown as being separate, other receipt formats have these two data pieces together in a single cluster under the address cluster. Below the date and receipt number cluster(s) is the body of the receipt, with an itemization cluster 340 directly adjacent a price cluster 350. Below all these clusters, and usually set apart from other clusters, is a total amount cluster 360 detailing the total amount for the goods and/or services itemized in the body of the receipt.

Referring to FIG. 6, the structure of a typical business invoice 400 is illustrated. As can be seen, an address cluster 410 is near the top of the invoice while a date/invoice cluster 420 is on the other side of the address cluster 410. This address cluster 410 usually contains the name and address of the issuer of the invoice while a recipient address cluster 430 below the address cluster 410 contains the address of the invoice recipient. The body cluster 440 contains the body of the invoice and has the itemized goods and services provided to the recipient. The total for the invoice is usually set apart in a total cluster 450 below and to the right of the body cluster. A terms cluster 460 is usually present at the bottom and to the left of the body cluster 440.

If the desired result is to extract the address, date, and total amount from a document, in a machine learning system, a number of similarities and patterns can be extrapolated by the system from the samples. In a rules-based system, the extrapolation may need to be determined beforehand and then hard coded into rules within the system. From FIGS. 4-6, it can be seen that, generally, the address block is near the top of the document. As well, for invoices and receipts, the total for the invoice or receipt is usually set apart near the bottom of the document. The date is usually near the top of the document and is usually adjacent or next to an address cluster. From these samples of typical business documents, a rule based data determination module can be constructed. Of course, given the variability of the structure of these business documents, such a rule based module may not perform as well as expected.

In another implementation, a neural network may be used in the data determination module. The neural network may be tasked with classifying the various clusters as a date cluster, an address cluster, or as a total amount cluster. Clusters that are larger than a certain size (i.e. clusters with more than a predetermined amount of characters) may be discarded as they would constitute body clusters and would not be a date, address, or total amount cluster. The neural network may be trained with a data set that includes different business letters, invoices, receipts, purchase orders, claim forms, pay slips, and other business-type documents whose clusters have already been classified as date, address, and total amount clusters. By using such a data set, the neural network can be trained to determine which of the clusters in a business document contains these data points (i.e. an address, a date, and a total amount).

Referring back to FIG. 3, it should also be clear that the cluster processing module 160 may also use a neural network to determine the various clusters in a document and to determine each cluster's position within the document. The result can then be fed into a neural network equipped data determination module 150 to find the date, address, and total clusters. The data within these clusters found can then be extracted and exported to other modules.

It should also be clear that further processing of the various clusters in a document can be performed to ensure that the desired clusters have been found. As an example, for a date cluster, the text within the cluster can be analyzed to scan for text corresponding to a month's name or abbreviation. Similarly, a potential address cluster can be analyzed to search for text that usually occurs in an address (e.g. "street", "st.", "avenue", "ave.", etc.). The relative positioning of a cluster can also be taken into account when determining the type of data within that cluster. As an example, a mid-sized cluster near the top of the document and between two smaller sized clusters may be an address cluster in a letter as in FIG. 4. Similarly, a mid-sized cluster at the very top of the document (and adjacent or above one or two smaller clusters) may be an address cluster in a receipt as in FIG. 4. As another example, a mid-sized cluster just above the largest cluster may be an address cluster as in FIG. 6. Absolute positioning of a cluster may also be determinative of the data within it. As an example, the cluster at the top of every receipt has the address within it. As well, the total amount on any invoice or receipt is at the bottom (or very near the bottom) of a document. Of course, this analysis and processing may be coded into a rule based data determination module or it may be introduced as a consideration when training a suitable neural network.

In yet another variant, the output of the system in FIG. 1 may be used as a suitable input to a neural network for data determination as noted above. The neural network can then determine which cluster contains which data and, accordingly, which data will need to be processed and/or extracted.

From the above, the various concepts and ideas noted for identifying, classifying, and determining the different clusters and data types may be used in various forms to process images of documents as well as to process documents themselves. The system of the present invention may be used to process, segment, and apply clustering to one or more documents in an image and to extract data regarding the various clusters found in the documents. The result can then be sent to another system for processing to determine what types of data are in those clusters and to provide a meaning or an interpretation to that data. Similarly, the present invention may include a sub-system that provides at least some of that meaning and/or interpretation to the data found in the various clusters.

The system of the present invention can thus not only process images of documents but also delineate, recognize, and extract the data contained within those documents. Then, based on information (e.g. contextual information) derived from a number of sources intrinsic to the document (e.g. the nature of the document, the data extracted from that document, the user's intent as extrapolated from the data in the document, etc., etc.), the system can determine the next processing steps for the document or for the data extracted from the document. As an example, a tax form may have a box to indicate expedited processing and a box for normal processing. A filling in box for expedited processing (and an unfilled normal processing box) would indicate to the system that the data extracted from the document would need to be placed in the expedited processing queue.

As noted above, as well, the system can, by judiciously determining which of a number of templates best matches the document in a candidate image, determine the contexts and parameters by which that document is to be processed. As an example, if multiple versions of a form are to be processed, the form of the document in a candidate image must first be determined so that the data extracted from that form can be processed accordingly. If one version of the form has data regarding a person's gender in one corner and another version has, instead, a person's marital status in that same corner, then one of the initial steps must be a determination of the version of the form being processed. By matching the document in the candidate image with one of the templates of the different versions of the form, the template that best fits the document in the candidate image should indicate which version of the form is being processed.

It should be clear that the modules of the various embodiments of the present invention may be implemented as purely software modules or they may be implemented as a combination of software and hardware modules.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g. "C") or an object-oriented language (e.g. "C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

We claim:

1. A system for processing an image containing at least one document, the system comprising: a non-transitory storage medium storing computer-readable instructions thereon; and at least one processor operatively connected to the non-transitory storage medium, the at least one processor, upon executing the computer-readable instructions, being configured for:
   analyzing an image to determine image quality parameters;
   determining if an image quality of said image is suitable for processing based on said image quality parameters;
      if the image quality parameters are not sufficient based on a threshold:
         adjusting at least one image quality parameter of said image to output an adjusted image;
      if the image quality parameters are sufficient based on the threshold: outputting the image as the adjusted image
   determining at least one boundary of said at least one document in said adjusted image;
   determining clusters of data based on said at least boundary in said at least one document, said determining clusters of data comprising determining cluster parameters regarding said clusters of data, the cluster parameters comprising position information, size information and relative position information of each cluster; and
   generating an output suitable for further processing to determine contents of said at least one document based on said cluster parameters.

2. The system according to claim 1, wherein said image contains multiple documents and said determining at least one boundary of said at least one document comprises determining boundaries for said multiple documents.

3. The system according to claim 1, wherein said adjusting one or more image quality parameters to obtain the adjusted image comprises one or more of:
   removal of artefacts from said image;
   adjusting a contrast of said image;
   cropping said image;
   adjusting a geometry of said image;
   adjusting said image to compensate for projection effects;
   adjusting a sharpness of said image; and
   adjusting a color of said image.

4. The system according to claim 1, wherein said adjusting one or more image quality parameters to obtain the adjusted image comprises one or more of:
   performing a rotation of said image;
   performing a partial rotation of said image;
   performing a geometric translation of said image;
   performing at least one image adjustment to compensate for projection effects;
   determining a top portion of said at least one document in said image;
   determining a bottom portion of said at least one document in said image;
   determining a delineation of a page in said at least one document in said image using a detection of either headers or footers in said page; and
   performing an OCR process on at least one portion of said at least one document.

5. The system according to claim 1, wherein said determining cluster parameters regarding said clusters of data comprises one or more of:
   placing bounding boxes around said clusters of data;
   determining a position of each cluster of data within said at least one document;
   concatenating adjacent clusters of data when necessary to form a single cluster of data;
   for at least one cluster of data containing text data, determining a font type used in said text data;
   for at least one cluster of data containing text data, determining a font size used in said text data;
   performing an OCR process on one or more clusters of data containing text data to determine a content of said one or more clusters of data;
   for at least one cluster of data containing image data, determining shapes present in said image data;
   for at least one cluster of data containing image data, determining lines present in said image data;
   for at least one cluster of data containing image data, determining if said image data contains a logo;
   for at least one cluster of data containing image data, determining if said image data contains a bar code;
   determining if a portion of said at least one document indicates a check box being filled in;
   determining if a portion of said at least one document indicates a radio button being activated;
   for at least one cluster of data containing image data, determining if said image data contains alphanumeric characters; and
   for each cluster of data, determining a size in pixels of said cluster.

6. The system according to claim 1, wherein said determining said at least one boundary of said at least one document comprises determining boundaries for multiple documents in said image.

7. The system according to claim 1, wherein the at least one processor is further configured for using a trained neural network to receive the suitable output, said neural network being for determining a type of data present in each cluster of data in said document.

8. A method for determining and extracting at least one type of data present in a business-related document, the method being executed by at least one processor, the method comprising:
   receiving an image of said business-related document;
   processing the image to identify clusters of data on said document from said image and to identify cluster parameters related to each cluster, wherein the cluster parameters related to each cluster comprise position information, size information and relative position information of each cluster;
   determining a respective content and respective content parameters of the content of each respective cluster; and
   determining a type of data present in a specific cluster based on: said parameters related to the specific cluster, parameters related to the content of the specific cluster and a content of said specific cluster; and extracting a relevant data from the specific cluster of the business-related document.

9. The method of claim 8, wherein said determining the content comprising determining if the content is one of: text data, image data, table data, and binary nature data.

10. The method of claim 9, wherein the type of data present in the specific cluster comprises alphanumeric characters.

11. The method of claim 9, wherein the parameters related to the content in the cluster comprise one of a font size and a font type, when the content is the text data; and the parameters related to the content in the cluster comprise one of an image size and a number of lines within the image, when the content is the image data.

12. A system for determining at least one type of data present in a business-related document, the system comprising: a non-transitory storage medium storing computer-readable instructions thereon; and at least one processor operatively connected to the non-transitory storage medium, the at least one processor, upon executing the computer-readable instructions, being configured for:
receiving an image of said document;
determining clusters of data in said document using said image, said determining clusters of data comprising identifying cluster parameters related to each cluster, wherein the cluster parameters related to each cluster comprise position information, size information and relative position information of each cluster;
determining a type of data present in at least one of specific cluster based on said cluster parameters of said at least one specific cluster in said document; and
extracting a relevant data from the specific cluster of the business-related document.

13. The system according to claim 12, wherein said at least one type of data comprises address data, date data, and total amount data.

14. The system according to claim 12, wherein said determining a type of data present in at least one of specific cluster based on cluster parameters of said at least one specific cluster in said document and extracting a relevant data from the specific cluster of the business-related document, is performed using a neural network.

15. The system according to claim 12, wherein, in addition to said position of said specific cluster in said document, said determining said type of data is based on said specific cluster's position relative to other clusters in said document.

16. The system according to claim 12, wherein, in addition to said position of said specific cluster in said document, said determining said type of data is based on a content of said specific cluster.

17. The system according to claim 12, wherein, in addition to said position of said specific cluster in said document, said data determining said type of data is based on a size of said specific cluster.

\* \* \* \* \*